United States Patent
Demers et al.

(10) Patent No.: US 7,109,992 B2
(45) Date of Patent: Sep. 19, 2006

(54) APPARATUS FOR GENERATING EFFICIENT WIDE-LINE ENDS

(75) Inventors: Eric Demers, Palo Alto, CA (US); Robert S. Mace, Scots Valley, CA (US)

(73) Assignee: ATI Technologies Inc., Markham (CA)

( * ) Notice: Subject to any disclaimer, the term of this patent is extended or adjusted under 35 U.S.C. 154(b) by 217 days.

(21) Appl. No.: 10/306,309

(22) Filed: Nov. 27, 2002

(65) Prior Publication Data

US 2004/0100469 A1 May 27, 2004

(51) Int. Cl.
*G06T 11/20* (2006.01)
(52) U.S. Cl. ............... 345/443; 345/611; 345/612
(58) Field of Classification Search ........ 345/612, 345/441, 443, 611
See application file for complete search history.

(56) References Cited

U.S. PATENT DOCUMENTS

| 5,847,715 | A | * | 12/1998 | Fujita et al. ............ 345/443 |
| 6,297,828 | B1 | * | 10/2001 | Fukuzawa ............... 345/443 |
| 6,433,790 | B1 | * | 8/2002 | Taylor et al. ............ 345/611 |
| 6,480,196 | B1 | * | 11/2002 | Harrington ............. 345/443 |
| 6,636,231 | B1 | * | 10/2003 | Ali-Santosa ............ 345/611 |
| 6,947,057 | B1 | * | 9/2005 | Nelson et al. .......... 345/611 |

* cited by examiner

*Primary Examiner*—Kee M. Tung
*Assistant Examiner*—Antonio Caschera
(74) *Attorney, Agent, or Firm*—Vedder, Price, Kaufman & Kammholz, P.C.

(57) ABSTRACT

A graphics processing circuit includes a line end generation circuit operative to generate line aligned end cap data in response to primitive data; and a rasterizer, coupled to the line end generation circuit, operative to generate pixel data representing a line to be rendered, the pixel data including the line aligned end cap data. A graphics processing method includes receiving primitive data for a line to be rendered, the primitive data including start endpoint data and stop endpoint data, determining the height and width of the line in screen space, determining line end cap orientation with respect to the line to be rendered, and determining vertices that define the line to be rendered, wherein the vertices define end caps aligned with the line to be rendered.

12 Claims, 5 Drawing Sheets

APPARATUS FOR GENERATING EFFICIENT WIDE-LINE ENDS

FIELD OF THE INVENTION

The present invention generally relates to graphics processing circuitry and, more particularly, to processing circuitry for generating square line ends.

BACKGROUND OF THE INVENTION

Computer graphics systems, set top box systems or other graphics processing systems typically include a host processor, graphics/video processing circuitry, memory (e.g. frame buffer), and one or more display devices. The host processor may have a graphics application running thereon, that provides vertex data for a primitive (e.g. triangle) to be rendered on the one or more display devices. The display device, for example, a CRT display includes a plurality of scan lines comprised of a series of pixels. The graphics/video processing circuitry receives the vertex data and generates pixel data including the appearance (e.g. color, brightness, texture) attributes which may be presented on the display device according to a particular protocol. The pixel data is typically stored in the frame buffer in locations that correspond to the pixels location on the display device.

FIG. 1 is a schematic representation of a two dimensional display space 10, for example, the visual area of a display device. The display space 10 is represented by a plurality of intersecting horizontal and vertical lines that form pixels 11. A pixel is one of a series of points along a raster scan line that when viewed in the aggregate, provides an image that may be presented on the display device. Line segments 12, 14, 20 and 22 which may be complete lines or portions of larger lines to be drawn on the display space 10, include line ends. For example, line segment 12 includes a line end 13. Typically, conventional graphics processing circuitry renders line ends as screen aligned segments. For example, if vertical line segment 12 is drawn, the corresponding line end 13 will be aligned with the horizontal boundary 16 of the display space 10. If horizontal line segment 14 is drawn, the corresponding line end 15 will be aligned with the vertical boundary 18 of the display space 10.

When non-vertical or non-horizontal line segments are drawn on a display space, the line ends typically will be aligned with the corresponding horizontal and vertical boundaries of the display space; not with the line segment. For example, if line segment 20 is drawn the corresponding line end 21 will be aligned with the horizontal boundary 16 of the display space 10. In the like manner, if line segment 22 is drawn, the corresponding line end 23 will be aligned with the vertical boundary 18 of the display space 10. Such line end alignment results in the rendered line segments 20, 22 or larger image including the line segments, containing visual artifacts (e.g. uneven edges) which degrade image appearance. To compensate for the visual artifacts, software executed by a host processor typically has been used to calculate the ends of non-horizontal and vertical lines, with the calculated line ends subsequently being sent to hardware, such as a graphics chip, for rendering. A drawback associated with using software to calculate the line ends is that it requires the processing of additional primitives which takes up valuable host processor time. In turn, this increases the time required to render an object or image.

BRIEF DESCRIPTION OF THE DRAWINGS

The present invention and the advantages and benefits provided thereby will be best understood and appreciated upon review of the following detailed description of a preferred embodiment, taken in conjunction with the following drawings, where like numerals represent like elements, in which.

DETAILED DESCRIPTION OF A PREFERRED EMBODIMENT

Briefly stated, a graphics processing circuit includes a line end generation circuit operative to generate line aligned end cap data in response to primitive data, and a rasterizer operative to generate pixel data representing a line to be rendered. The pixel data includes the line aligned end cap data. A graphics processing method includes receiving primitive data for a line to be rendered, where the primitive data includes start endpoint data and stop endpoint data. Next the height and width of the line in screen space is determined. Following the height and width determination, line end cap orientation with respect to the line to be rendered is determined. Finally, the vertices that define the line to be rendered are determined, where the vertices define end caps that are aligned with the line to be rendered.

By employing the graphics processing circuit and/or corresponding method of the present invention, lines to be rendered include end caps that are perpendicular to the line to be drawn independent of line orientation. An exemplary embodiment of the present invention will now be discussed with reference to FIGS. 2–7. The following description refers to components including arithmetic circuitry and logic circuitry. Such arithmetic circuitry and logic circuitry may include, for example, arithmetic logic units (ALU), digital signal processing (DSP) circuits, logic (e.g. AND, OR) gates, state machines and any other suitable hardware for performing the described functionality and combinations thereof.

Figure 1:
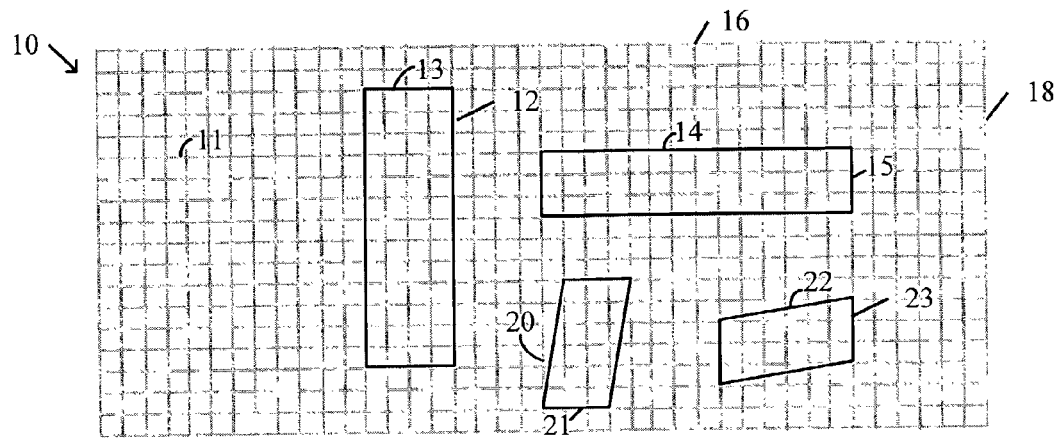
FIG. 1 is a schematic representation of line segments being rendered onto a two dimensional space.
Figure 3:
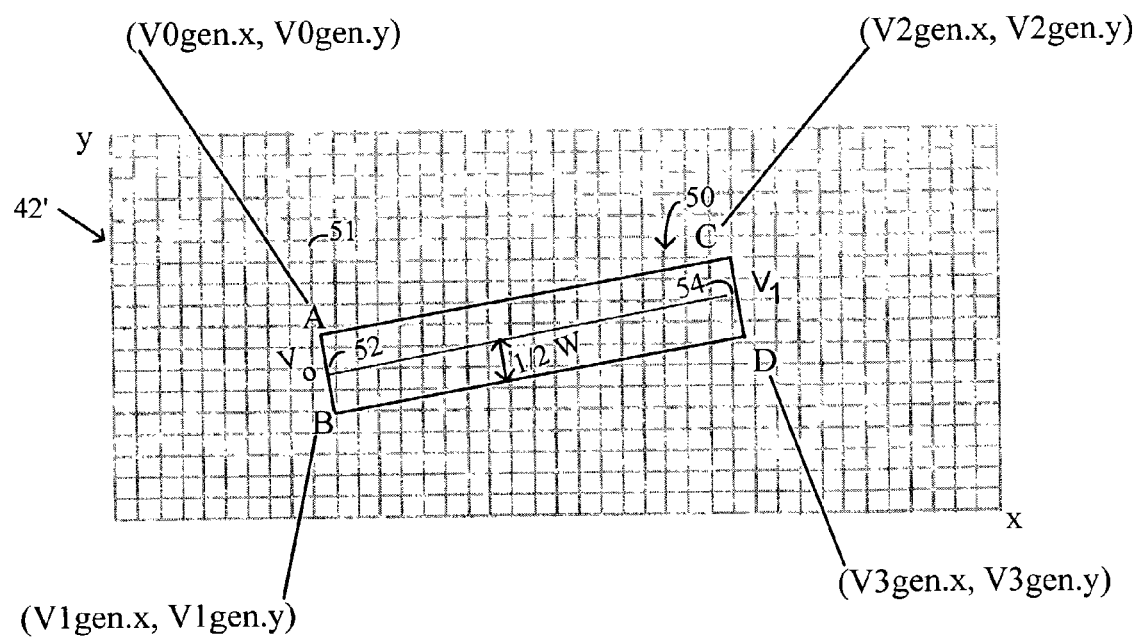
FIG. 3 is a schematic representation of a line drawn by the graphics processing circuit illustrated in FIG. 2.
Figure 2:
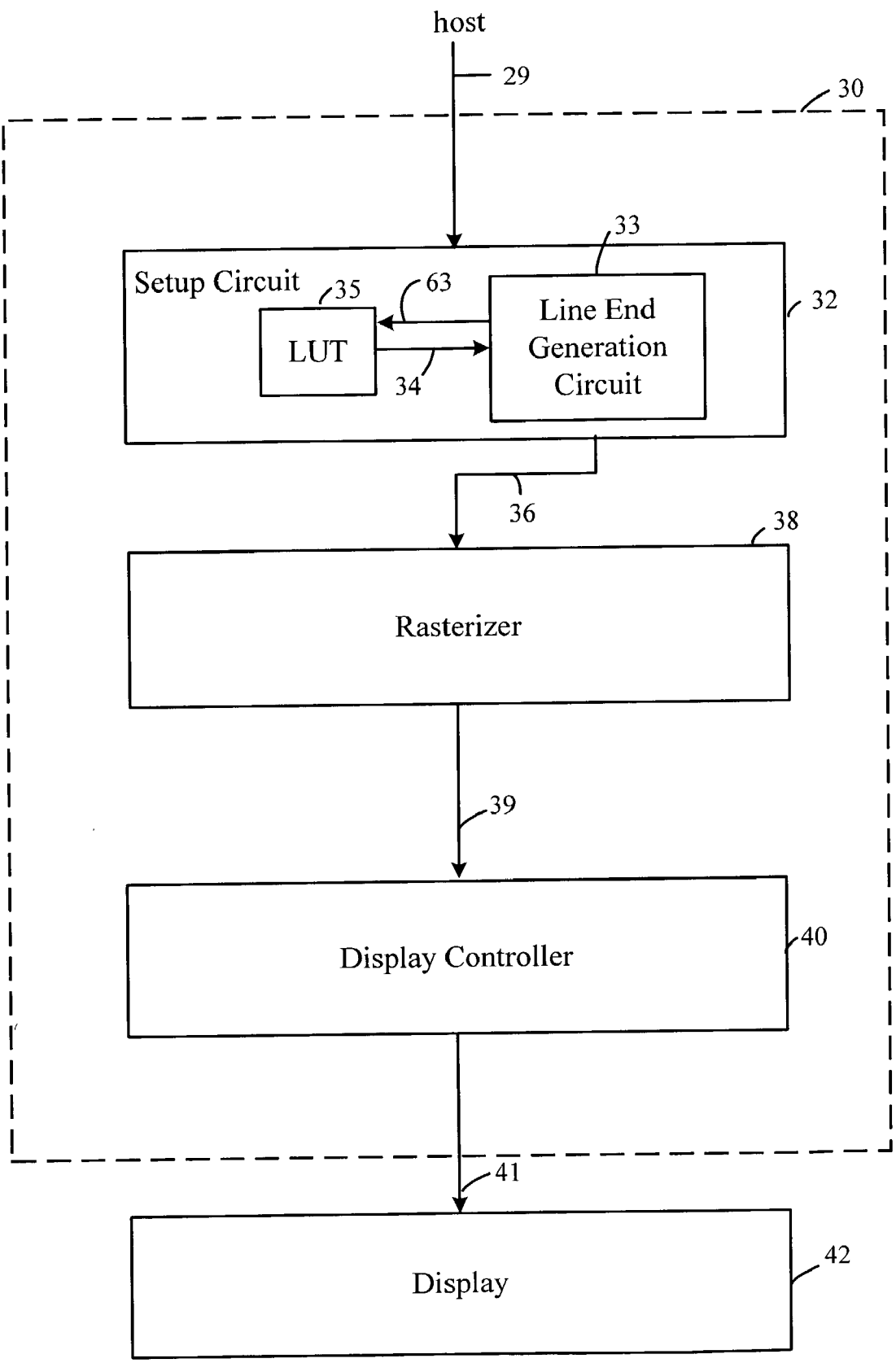
FIG. 2 is a schematic block diagram of one example of a graphics processing circuit incorporating exemplary line end generation circuitry according to one embodiment of the present invention.

FIG. 2 is a schematic block diagram of an exemplary graphics processing circuit 30 according to the present invention. The graphics processing circuit 30 is preferably a portion of a stand-alone graphics processing chip or may also be integrated with a host processor or other circuit, if desired, or part of a larger system. The graphics processing circuit 30 includes a set up circuit 32, including a line end generation circuit 33, operative to generate line aligned end cap data 36 in response to primitive data 29 according to the present invention. End caps are the termination points along the minor axes of a line. The set up circuit 32 also includes a look-up table (LUT) 35, or other suitable memory, operative to store angle data 34 representing the orientation of the line to be rendered with respect to the horizontal plane of display space 42' (FIG. 3). The angle data 34 is used in determining the line aligned end cap data 36. Although illustrated as being part of the setup circuit 32, the line end generation circuit 33 may be implemented as stand-alone circuitry or may be part of any other suitable circuit.

A rasterizer 38 is coupled to the line end generation circuit 33, and is operative to generate pixel data 39 representing the line to be rendered, the pixel data 39 including the line aligned end cap data 36. The pixel data 39 is provided to a display controller 40. The display controller 40 provides formatted pixel data 41 including the end cap data formatted for proper presentation on a display 42. The display controller 40 can be any device capable of formatting incoming pixel data to be presented on a corresponding display 42. The display 42 may be, for example, a CRT, an LCD, flat panel display, high definition television (HDTV) or any suitable display device or combination thereof.

Figure 4:
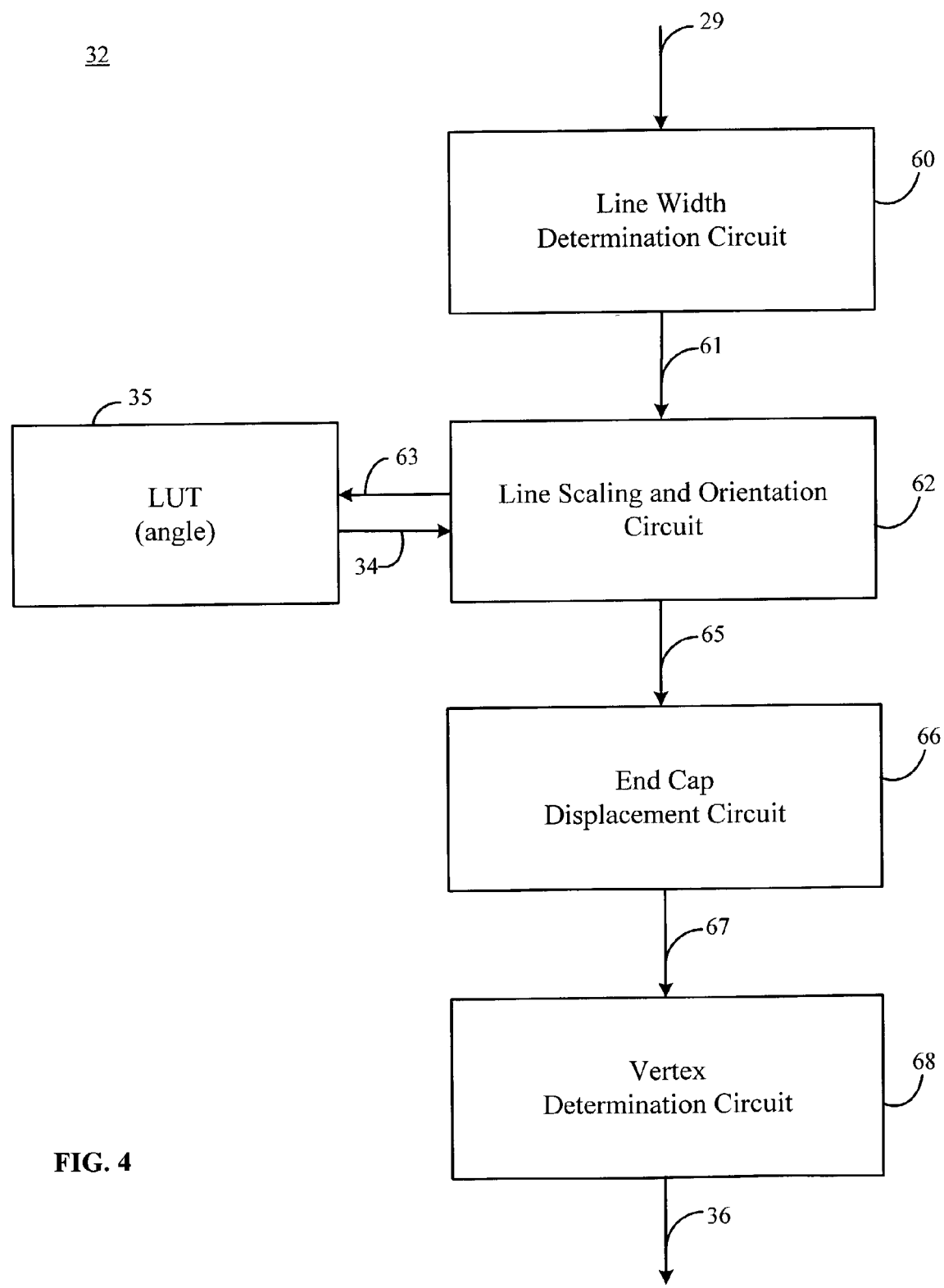
FIG. 4 is a schematic block diagram of the line end generation circuit implemented in the graphics processing circuit illustrated in FIG. 2.

Referring to FIGS. 3 and 4, primitive data 29, including for example, the start endpoint data $V_0$, stop endpoint data $V_1$ of a line 50 to be rendered in display space 42', and data representing the thickness of the line 50 to be rendered is provided to the set up circuit 32 by a processor, such as a host processor (not shown). The display space 42' is represented as a plurality of intersecting horizontal and vertical lines that define pixels 51. The host processor may be a system processor or a graphics/video application executing on the host processor.

The primitive data 29 is received by a line width determination circuit 60, which may include registers for maintaining the start endpoint data $V_0$ and the stop endpoint data $V_1$ of the line 50 to be rendered and arithmetic circuitry and logic circuitry operative to determine the length of the major (e.g. x-direction) axis and minor (e.g. y-direction) axis, in display space 42', of the line 50 to be rendered and to determine the width of the line 50, for example, by calculating the maximum and minimum displacement values of the line 50 along either the major or minor axis.

The maximum and minimum displacement values 61 are provided to a line scaling and orientation circuit 62, which is operative to generate an 8-bit value 63, for example, by concatenating the three most significant bits of the maximum displacement value with the five most significant bits of the minimum displacement value. The resulting 8-bit value 63 is used to address a look-up table (LUT) 35. The LUT 35 stores angle data 34 representing the orientation of the line defined by the start endpoint $V_0$ and the stop endpoint $V_1$, with respect to the horizontal plane of the display space 42'. The LUT 35 provides the angle data 34 to the line scaling and orientation circuit 62. The line scaling and orientation circuit 62 further includes arithmetic circuitry and logic circuitry operative to perform scaling operations such that the rendered line 50 is within the display space 42', for example, by multiplying the angle data 34 provided by the LUT 35 to the maximum displacement value and minimum displacement value data 61 provided by the line width determination circuit 62. The scaled and oriented displacement data 65 is provided to an end cap displacement circuit 66.

The end cap displacement circuit 66 may include registers, arithmetic circuitry and logic circuitry operative to determine end cap displacement data 67 representing the x-direction and y-direction displacement in display space of the scaled and oriented displacement data 65 relative to the initial start endpoint $V_0$ and stop endpoint $V_1$ of the line 50 to be rendered. The displacement data 67 is then provided to a vertex determination circuit 68.

The vertex determination circuit 68 may include registers for maintaining the display space coordinates of the start (e.g. V0in.x, V0in.y) endpoint $V_0$ and the stop (e.g. V1in.x, V1in.y) endpoint $V_1$ and further may include logic circuitry and/or arithmetic circuitry operative to determine the vertex data (e.g. A–D) of the line 50 to be rendered, where the vertex data A–D defines the lined aligned end caps 52, 54 such that the end caps are aligned perpendicular to the major axis of the line 50 to be rendered. Exemplary calculations performed by the vertex determination circuit 68 for determining the vertices of the line 50 are presented below:

A: $V0gen.x = V0in.x - dxp$, $V0gen.y = V0in.y + dyp$

B: $V1gen.x = V0in.x + dxp$, $V1gen.y = V0in.y - dyp$

C: $V2gen.x = V1in.x - dxp$, $V2gen.y = V1in.y + dyp$

D: $V3gen.x = V1in.x + dxp$, $V3gen.y = V1in.y - dyp$ where V0gen.x, V0gen.y, V1gen.x, V1gen.y, V2gen.x, V2gen.y, V3gen.x, V3gen.y represent the vertices (A–D) which define the boundaries of the line 50 to be rendered such that the end caps 52, 54 are rendered in alignment with the line 50; dxp represents the x-direction displacement in display space units generated in the end cap displacement circuit 66; dyp represents the y-direction displacement in display space units generated by the end cap displacement circuit 66, where the dxp and dyp values represent the displacement data 67. By generating the line vertex data (V0gen-V3gen), the end caps 52, 54 will be drawn at substantially right angles (e.g. perpendicular) to the line 50 to be rendered; thereby reducing the visual artifacts caused by, for example, uneven line edges that typically result from conventional line rendering hardware.

Figure 5:
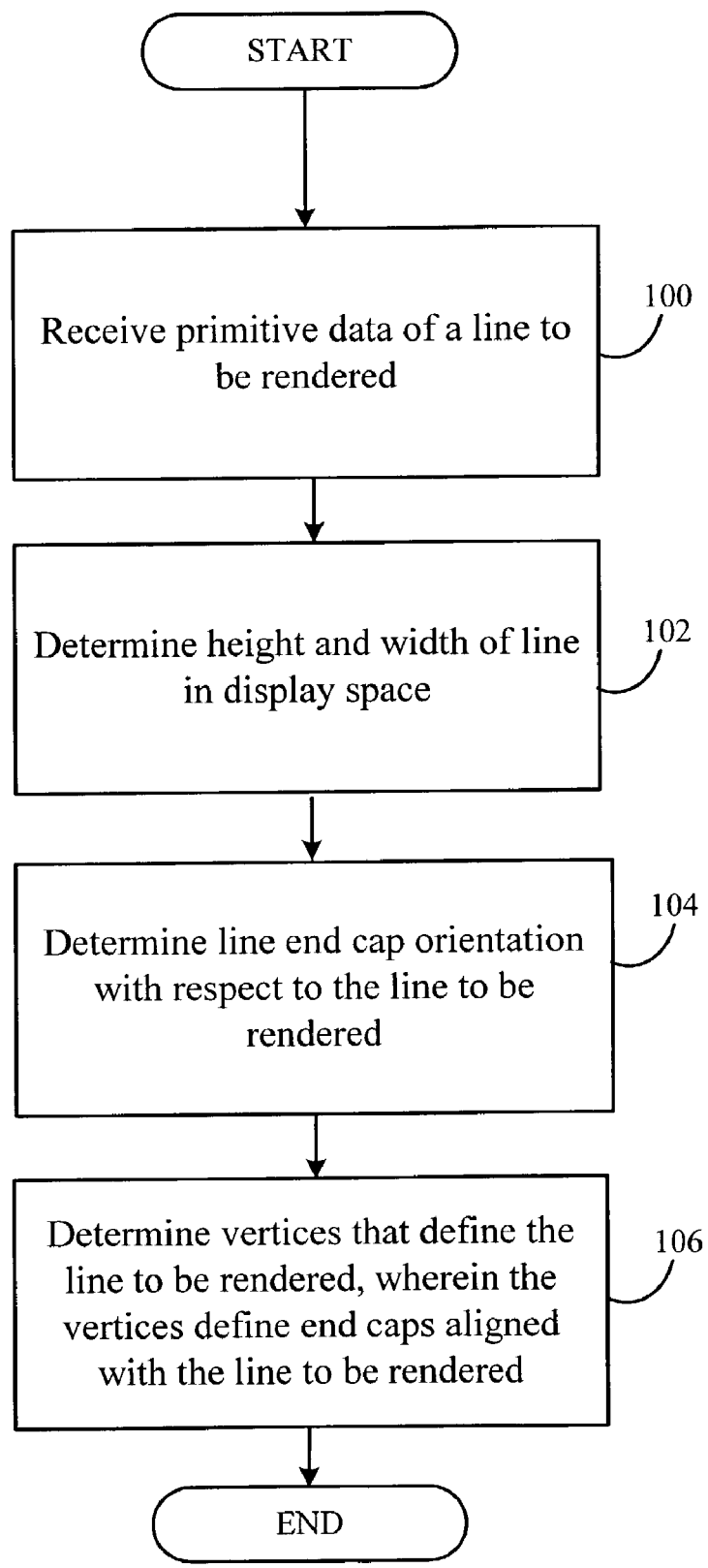
FIGS. 5–7 are flowcharts illustrating the operations performed by the graphics processing circuit when generating line end data according to the present invention.
Figure 6:
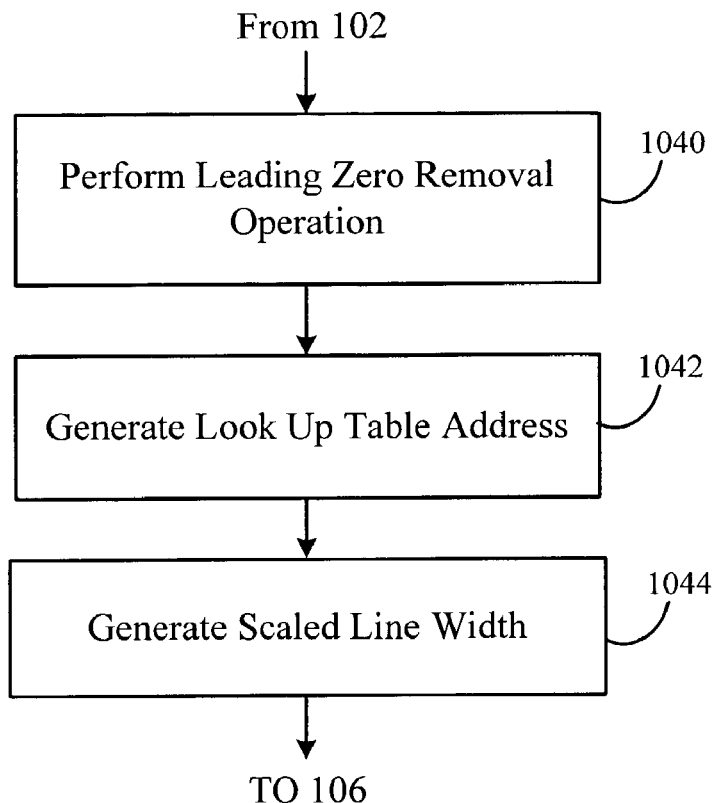
Figure 7:
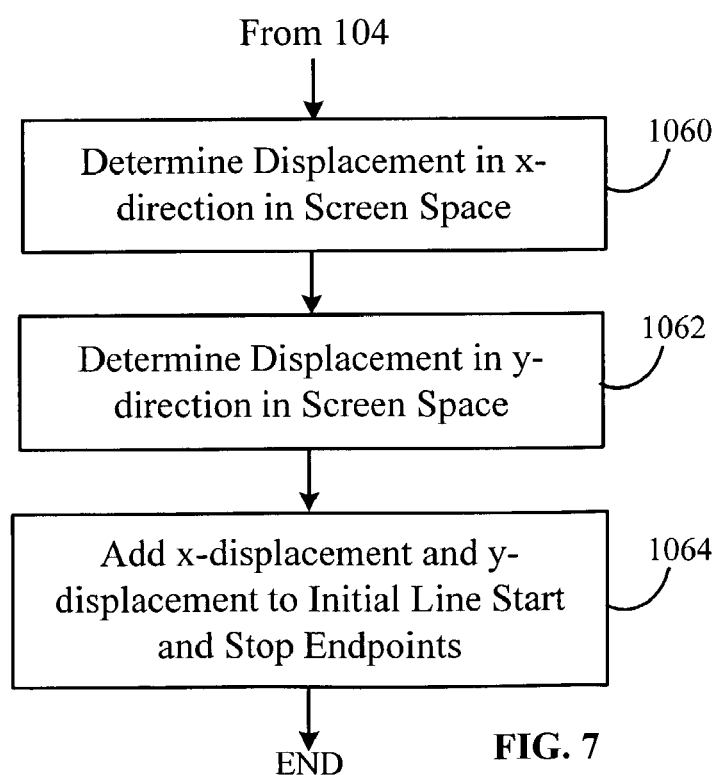

FIGS. 5–7 are flowcharts illustrating the operations performed by the graphics processing circuit 30 or other suitable circuit when generating the vertices A–D that define the line 50 to be rendered, including data representing the line aligned end caps 52, 54 according to the present invention. The process begins at step 100, where the graphics processing circuit 30 receives the primitive data of a line to be rendered. This corresponds to the line width determination circuit 60 (FIG. 4) receiving, for example, the start endpoint data $V_0$ and the stop endpoint data $V_1$ of a line to be rendered.

In step 102, the height and width of the line to be rendered in display space is determined. This is performed in the line width determination circuit 60 (FIG. 4), for example, by determining the horizontal (e.g. x-direction) and vertical (e.g. y-direction) displacement of the line with respect to the start endpoint $V_0$ and stop endpoint $V_1$, which represent the width and height of the line, respectively in display space; storing the larger displacement value in a first register and the smaller displacement value in a second register. Next, the bits representing the stored displacement values are shifted to the left by the number of zeros, for example, in the most significant bits of the register containing the larger displacement value.

In step 104, the orientation of the end caps with respect to the line to be rendered is determined. Referring briefly to FIG. 6, the end cap orientation determination is accomplished, for example, by performing a lead zero operation on the maximum and minimum displacement values in step 1040. Performing the lead zero operation reduces the size of the LUT required; thereby reducing the overall size of the graphics processing circuit. In step 1042, an 8 bit look-up table address is generated by concatenating the three most significant bits of the maximum displacement value and the five most significant bits of the minimum displacement value. The generated address is then transmitted to the LUT 35 (FIG. 4). In step 1044, a scaled line width value is generated, for example, by multiplying the angle (e.g. sine/ cosine) data 34 from the LUT 35 by the corresponding maximum displacement value and minimum displacement value; thereby, providing the width of the end caps 52, 54, normalized in display space 42.

Referring back to FIG. 5, in step 106, the vertices (A–D) that define the line to be rendered are determined. Referring briefly to FIG. 7, the vertex determination operation is performed by determining the displacement in the x-direction of the end caps in display space in step 1060. In step 1062, the displacement of the end caps in the y-direction in display space is determined and the x-displacement and the y-displacement values determined in steps 1060 and 1062 are then added to the initial start endpoint and stop endpoint values; thereby, defining the vertices (e.g. VNgen) of the line to be rendered, where the generated vertices also define the perpendicularly oriented end caps 52, 54 (FIG. 3) of the line 50.

By performing the operations disclosed above, line aligned end caps, where the line ends of the line to be rendered are substantially perpendicular to the major (i.e. longer) axis is determined, independent of the orientation of the line to be rendered. This results in the subsequently rendered line having even edges as compared to conventional hardware rendering; thereby providing a rendered line or object having significantly less visual artifacts as compared to conventionally rendered images. Additionally, as the end cap determination is performed in hardware, rendering efficiency is enhanced as compared to conventional methods which require additional software processing to generate the end portions of a line.

The above described detailed description of the invention and the examples described therein have been provided for the purposes of illustration and description. Although an exemplary embodiment of the present invention has been described in detail herein with reference to the accompanying drawings, it is to be understood that the present invention is not limited to the embodiment disclosed, and that various changes and modifications to the invention are possible in light of the above teaching. Accordingly, the scope of the present invention is to be defined by the claims appended hereto.

What is claimed is:

1. A graphics processing circuit, comprising:
   a line end generation circuit operative to generate line aligned end cap data in response to primitive data;
   a rasterizer, coupled to the line end generation circuit, operative to generate pixel data representing a line to be rendered, the pixel data including the line aligned end cap data; and
   wherein the line end generation circuit further comprises a line width determination circuit, operative to determine the width of the line to be rendered in response to the primitive data; a line scaling and orientation circuit, coupled to the line width determination circuit, operative to determine the orientation of scaled end cap data in response to line angle data; and a vertex determination circuit, coupled to the line scaling and orientation circuit, operative to determine the vertex data of the line to be rendered, the vertex data defining the line aligned end caps.

2. The graphics processing circuit of claim 1, further comprising a display controller, coupled to the rasterizer, operative to format and transmit the pixel data representing the line for presentation on a display.

3. The graphics processing circuit of claim 1, wherein the primitive data further includes start endpoint data and stop endpoint data and the line end generation circuit further comprises an end cap displacement circuit, coupled between the line scaling and orientation circuit and the line vertex determination circuit, operative to determine data representing the displacement of the scaled end cap data relative to the start endpoint data and the stop endpoint data.

4. The graphics processing circuit of claim 1, wherein the line scaling and orientation circuit is operative to scale the line to be within screen space.

5. The graphics processing circuit of claim 1, further comprising a look up table, coupled to the line scaling and orientation circuit, operative to provide the line angle data in response to an address provided by the line scaling and orientation circuit.

6. The graphics processing circuit of claim 5, wherein the line angle data represents the orientation of the end caps, wherein the end caps are aligned perpendicular to the line to be rendered.

7. A graphics processing method, comprising:
   receiving primitive data for a line to be rendered, the primitive data including start endpoint data and stop endpoint data;
   determining height and width of the line in screen space;
   determining line end cap orientation with respect to the line to be rendered;
   determining vertices that define the line to be rendered, wherein the vertices define end caps aligned with the line to be rendered;
   wherein determining the height and width of the line in screen space further comprises determining the maximum displacement and minimum displacement values based on the height and width of the line to be rendered, and performing a lead zero function on the maximum and minimum displacement values.

8. The graphics processing method of claim 7, wherein determining the line end cap orientation further comprises receiving a value representing an angle that is perpendicular to the line to be rendered, and generating scaled line width data in response to the angle data.

9. The graphics processing method of claim 7, wherein determining the vertices that define the line to be rendered further comprises determining displacement in the x-direction in screen space; determining displacement in the y-direction in screen space; and adding the x-direction displacement and the y-direction displacement to the start endpoint data and the stop endpoint data.

10. A graphics processing circuit, comprising:
    a line width determination circuit operative to receive primitive data and determine the width of a line to be rendered in response to the primitive data;
    a line scaling and orientation circuit, coupled to the line width determination circuit, operative to determine the orientation of scaled end cap data in response to line angle data;
    an end cap displacement circuit, coupled to the line scaling and orientation circuit, operative to determine data representing the displacement of the scaled end cap data relative to a portion of the primitive data;

a vertex determination circuit, coupled to the end cap displacement circuit, operative to determine the vertex data of the line to be rendered, the vertex data defining the line aligned end caps; and a rasterizer, coupled to the vertex determination circuit, operative to generate pixel data representing the line to be rendered, the pixel data including line aligned end cap data.

11. The graphics processing circuit of claim 10, further comprising a display controller, coupled to the rasterizer, operative to format the pixel data for presentation on a display.

12. The graphics processing circuit of claim 10, further comprising a look up table, coupled to the line scaling and orientation circuit, operative to maintain the line angle data.

* * * * *